(12) United States Patent
Nyssen et al.

(10) Patent No.: US 6,478,866 B1
(45) Date of Patent: Nov. 12, 2002

(54) AQUEOUS PIGMENT PREPARATIONS

(75) Inventors: Peter Roger Nyssen, Dormagen (DE); Wolfgang Zarges, Köln (DE); Achim Brand, Bienne (CH); Thomas Roick, Leverkusen (DE); Hans Peter Geiger, Rösrath (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/600,526

(22) PCT Filed: Jan. 7, 1999

(86) PCT No.: PCT/EP99/00033

§ 371 (c)(1),
(2), (4) Date: Aug. 14, 2000

(87) PCT Pub. No.: WO99/37718

PCT Pub. Date: Jul. 29, 1999

(30) Foreign Application Priority Data

Jan. 20, 1998 (DE) .......................... 198 01 759

(51) Int. Cl.⁷ .................. C09B 67/20; C09B 67/38; C08G 10/00; C08G 14/00; C09D 17/06
(52) U.S. Cl. .................. 106/503; 8/94.26; 8/94.33; 106/420; 106/447; 106/453; 106/460; 106/476; 106/479; 106/480; 106/493; 106/494; 106/495; 106/496; 106/497; 106/498; 106/499; 106/823; 106/31.6; 252/8.57; 507/117; 516/909
(58) Field of Search ................. 106/499, 493, 106/494, 495, 496, 497, 498, 503, 31.6, 429, 447, 453, 460, 476, 479, 480, 823; 8/94.26, 94.33; 252/8.57; 507/117; 516/909

(56) References Cited

U.S. PATENT DOCUMENTS

| 4,465,492 A | 8/1984 | Putzar ................... 8/589 |
| 5,003,034 A | 3/1991 | Jarzombek et al. ....... 528/272 |
| 5,565,102 A | 10/1996 | Brandt et al. ........ 210/500.28 |
| 5,810,266 A | 9/1998 | Nyssen et al. ............. 241/5 |
| 5,888,400 A * | 3/1999 | Tholema ............... 210/644 |

FOREIGN PATENT DOCUMENTS

| DE | 197 12 486 | 10/1998 |
| EP | 0 518225 | 10/1996 |
| EP | 0 556 649 | 6/1999 |

OTHER PUBLICATIONS

Database WPI, AN 90–019562 05, XP002102518 "Coating Composition", & JP 01 299875 A (Toyo Ink Mfg. Co. Ltd.) Dec. 4, 1989.
Database WPI, AN 79–22982b 12, XP002102519, Reduction of watercontent of pigment filter cake: & JP 54 020041 A (Toyo Ink Mfg. Co. Ltd.) Feb. 15, 1979.

* cited by examiner

*Primary Examiner*—Anthony J. Green
(74) *Attorney, Agent, or Firm*—Joseph C. Gil; Thomas W. Roy

(57) ABSTRACT

Aqueous pigment preparations containing a) at least one pigment, b) at least one condensation product based on A) suphonated aromatics, B) aldehydes and/or ketones and optionally C) one or several compounds selected from the group of non sulphonated aromatics, urea and urea derivatives, and c) at least one polyether polyol with a boiling point of above 150° C., at normal pressure. The inventive preparations are highly suitable for pigmenting natural or synthetic materials.

22 Claims, No Drawings

AQUEOUS PIGMENT PREPARATIONS

The invention relates to aqueous pigment preparations, to a process for their preparation and to their use for pigmenting natural and synthetic materials.

BACKGROUND OF THE INVENTION

Aqueous pigment preparations are already known from the prior art, for example DE-A 3 231 299, EP-A 816 406 and DE-A 41 25 458.

However, these pigment preparations have certain application disadvantages. The present invention, then, provides aqueous pigment preparations comprising a) at least one pigment, b) at least one condensation product based on
   A) sulphonated aromatics,
   B) aldehydes and/or ketones and optionally
   C) one or more compounds selected from the group consisting of unsulphonated aromatics, urea and urea derivatives, and c) at least one polyetherpolyol having an atmospheric pressure boiling point of greater than 150° C., in particular greater than 250° C.

DETAILED DESCRIPTION OF THE INVENTION

The pigments in the pigment preparations of the invention are not subject to any restriction. They can be organic or inorganic in nature. Suitable inorganic pigments for component a) are for example oxide pigments such as iron oxides, titanium dioxide, nickel oxides, chromium oxides and cobalt blue and also zinc sulphides, ultramarine, sulphides of the rare earths, bismuth vanadate and also carbon black, which is considered a pigment for the purposes of this invention. Particular carbon blacks are the acidic to alkaline carbon blacks obtained by the gas or furnace process and also chemically surface-modified carbon blacks, for example sulpho- or carboxyl-containing carbon blacks.

Suitable organic pigments are for example those of the monoazo, disazo, laked azo, β-naphthol, Naphthol AS, benzimidazolone, diazo condensation, azo metal complex, isoindolinone and isoindoline series, also polycyclic pigments for example from the phthalocyanine, quinacridone, perylene, perinone, thioindigo, anthraquinone, dioxazine, quinophthalone and diketopyrrolopyrrole series. Suitable pigments also include solid solutions of the pigments mentioned, mixtures of organic and/or inorganic pigments with organic and/or inorganic pigments such as, for example, carbon black coated metal, mica or talc pigments, for example mica CVD-coated with iron oxide, and also mixtures between the pigments mentioned. Other suitable pigments include laked dyes such as Ca, Mg and Al lakes of sulpho- and/or carboxyl-containing dyes.

Particularly preferred pigments from the group of the azo metal complex pigments are pigments of the formula (III) or their tautomeric forms

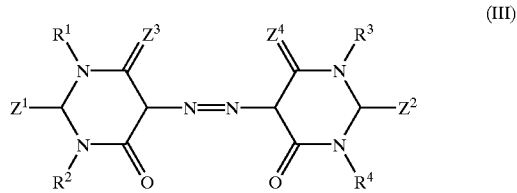

where
R$^1$, R$^2$, R$^3$ and R$^4$ are independently hydrogen, alkyl, especially C$_1$–C$_6$-alkyl, cycloalkyl, especially C$_5$–C$_8$-cycloalkyl, aryl, especially optionally substituted phenyl, aralkyl, especially C$_6$–C$_{10}$-aryl-C$_1$–C$_4$-alkyl, such as benzyl or ethylphenyl, or hetaryl, Z$^1$ to Z$^4$ are independently O or NR$^5$, and R$^5$ is hydrogen or cyano.

Particularly preferred pigments of the formula (III) conform to the formulae (VIII) and (IX)

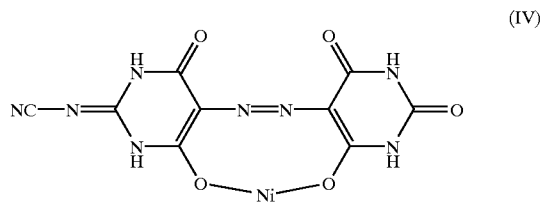

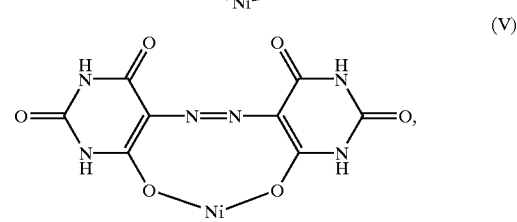

especially in the form of their inclusion compounds or intercalation compound, in which case the included compound is preferably a cyclic or acyclic compound, preferably carboxylic or sulphonic acid amides, urea or substituted ureas and also heterocycles, especially 2,4,6-triamino-1,3,5-triazine, acetoguanamine and benzoguanamine.

Suitable salts and complexes for the compounds of the formula (III) are preferably the salts and complexes of mono-, di-, tri- and tetraanions with the metals Li, Cs, Mg, Cd, Co, Al, Cr, Sn, Pb, particularly preferably Na, K, Ca, Sr, Ba, Zn, Fe, Ni, Cu, Mn. Of particular importance are the nickel salts and complexes and their solid solutions, intercalation and inclusion compounds. Particular preference is given to an inclusion compound, intercalation compound, solid solution of a salt or of a complex of azobarbituric acid, particularly preferably of the azobarbituric acid-nickel-1:1 complex.

Condensation Product of Component b)

Based on it is to be understood as meaning that the condensation product may have been prepared from reactants in addition to A, B and optionally C. However, for the purposes of this application, preference is given to the condensation products prepared only from A, B and optionally C.

For the purposes of this invention, the sulphonated aromatics of component A) also include sulphomethylated aromatics. Preferred sulphonated aromatics are: naphthalenesulphonic acids, phenolsulphonic acids, dihydroxybenzenesulphonic acids, sulphonated ditolyl ethers, sulphomethylated 4,4'-dihydroxydiphenyl sulphone, sulphonated diphenylmethane, sulphonated biphenyl, sulphonated hydroxybiphenyl, especially 2-hydroxybiphenyl, sulphonated terphenyl and benzenesulphonic acids.

The aldehydes and/or ketones of component B) are especially aliphatic, cycloaliphatic and also aromatic ones. Preference is given to aliphatic aldehydes, particular preference being given to formaldehyde and to other aliphatic aldehydes having 3 to 5 carbon atoms.

The unsulphonated aromatics of component C) include for example phenol, cresol, 4,4'-dihydroxydiphenyl sulphone or dihydroxydiphenylmethane.

Examples of urea derivatives are dimethylolurea, melamine and guanidine.

The preferred condensation product for component b) is a condensation product based on A) at least one sulphonated aromatic selected from the group consisting of naphthalenesulphonic acids, phenolsulphonic acids, dihydroxybenzene-sulphonic acids, sulphonated ditolyl ethers, sulphomethylated 4,4'-dihydroxydiphenyl sulphone, sulphonated diphenylmethane, sulphonated biphenyl, sulphonated hydroxybiphenyl, especially 2-hydroxybiphenyl, sulphonated terphenyl and benzenesulphonic acids, B) formaldehyde and optionally C) one or more compounds selected from the group consisting of phenol, cresol, 4,4'-dihydroxydiphenyl sulphone, dihydroxydiphenylmethane, urea, di-methylolurea, melamine and guanidine.

The preferred condensation product preferably has an average degree of condensation of 1 to 150, particularly preferably from 1 to 20, especially from 1 to 5.

The condensation products of component b) can be used as aqueous solution or as a suspension or as solid for example as powder or granules, preferably as spray-dried powder or granules.

Preferred condensation products of component b) have an inorganic salt content of below 10% by weight, preferably below 5% by weight, especially below 1% by weight, based on the aqueous solution or suspension of the component used or based on the solids of component b) used.

It is likewise preferable to use condensation products of component b) which are low in or free from residual monomer.

By low in monomer is understood a residual monomer content of less than 30% by weight, preferably less than 20% by weight, based on the condensation product, especially <10% by weight, preferably <5% by weight. Residual monomers in this context are the reactants used for preparing the condensation product.

Condensation products of this type which are low in salt and low in residual monomer are known from EP-A 816 406, for example.

The condensation products of component b) can be prepared for example by first preparing the sulphonated aromatics of component A) optionally in a mixture with unsulphonated aromatics of component C) by reacting the parent aromatics with a sulphonating agent, preferably sulphuric acid, especially concentrated sulphuric acid, chlorosulphonic acid, amidosulphonic acid or oleum.

The amount of sulphonating agent used per 1 mol of the parent aromatic of component A) is preferably 0.4 to 3.2 mol, especially 0.8 to 1.6 mol.

This is followed by the condensation with aldehydes and/or ketones of components B), preferably formaldehyde, optionally together with further compounds of component C). The condensation is preferably carried out in aqueous solution at a pH of 0 to 9. The condensation is preferably carried out using 0.4 to 1.5 mol, especially 0.4 to 1.0 mol, of component B) per mole of the sulphonated aromatic A) or per mole of a mixture of sulphonated aromatics of component A) and unsulphonated aromatics of component C).

This is followed if necessary by the neutralization of the sulpho-containing condensation product of component b) with a base.

The removal of the inorganic acid or its salts and the reduction in the residual monomer content can be effected for example by means of membrane separation processes. Preferred membrane separation processes are ultrafiltration, diffusion dialysis or electrodialysis.

The membranes used in the membrane separation processes, preferably ultra-filtration, have a molecular weight cut-off (MWCO) of 1000 to 50,000 dalton in a preferred embodiment.

The removal of the inorganic acid with the aid of a membrane separation process is preferably effected by means of a diafiltration using acid-stable ultra- or nano-filtration membranes by a cross-flow technique. Suitable membranes include for example polyhydantoin membranes as disclosed in EP-A 65 20 44.

Preferred membranes for this purpose have an MWCO level of 2000 to 20,000 dalton. If desired, this operation is accompanied by a concentrating step.

The invention further provides novel preparations comprising at least one condensation product b1) based on 4,4'-dihydroxydiphenyl sulphone, sulphonated ditolyl ethers and formaldehyde; 4,4'-dihydroxydiphenyl sulphone, phenolsulphonic acid and formaldehyde; 4,4'-dihydroxydiphenyl sulphone, sodium bisulphite, formaldehyde and urea; naphthalenesulphonic acid, 4,4'-dihydroxydiphenyl sulphone and formaldehyde; sulphonated terphenyl and formaldehyde; and/or sulphonated 2-hydroxybiphenyl and formaldehyde.

These novel preparations of condensation products b1) have an inorganic salt content of <10% by weight, especially <5% by weight, particularly preferably <1% by weight, based on the preparation.

The condensation product b1) further has an average degree of condensation of 1 to 150, preferably 1 to 20, particularly not more than 5, preferably of 1 to 5.

The novel preparation comprising the condensation product b1) preferably has a residual monomer content of less than 30% by weight, preferably less than 20% by weight, especially less than 10% by weight, particularly preferably less than 5% by weight, based on the condensation product b1).

These novel preparations are preferably obtained by preparing the condensation products b1) and subsequent membrane treatment with or without drying. Suitable membrane separation processes are those mentioned above. The process parameters known from EP-A 816 406 can be essentially complied with.

The preparation comprising component b1) can be used for example as aqueous solution or suspension or as solid for example as powder or granules preferably as spray-dried powder or granules.

The preparation comprising component b1) is preferably used as component b) in the aqueous pigment preparations of the invention.

The present invention further provides for the use of the novel preparation comprising condensation product b1) as tanning materials, plasticity enhancers, drilling aids or dispersants.

The use as dispersants of the preparations of the invention is preferably characterized in that the preparation of the invention is added to an aqueous suspension of a solid, especially of a pigment, preferably of an organic pigment and/or of a dye and/or of an optical brightener and/or of a crop protection agent and the suspension is if necessary homogenized, for example in a wet comminutor such as a bead mill.

This produces for example low-viscosity stable dispersions which are spray-dried, if desired.

To prepare preferred pigment preparations of the invention, one or more preparations of the invention are applied to the surface of the pigments. This can take place for example during or after pigment synthesis, in the course of a finishing process, in the course of the incorporation of the pigment into an application medium or in the course of the above-described production of the pigment preparation of the invention.

The use of the preparations of the invention as plasticity enhancers in particular concrete plasticizers, or drilling aids is preferably characterized in that a suspension or solid to be plasticized is admixed with the preparation of the invention, preferably in an amount of 0.1 to 1.0% by weight, based on the suspension to be plasticized, if necessary together with water.

The use as tanning materials of the preparations of the invention is preferably characterized in that a tanned leather, for example a wet blue, is neutralized, retanned, dyed and/or fatliquored in the presence of the preparation of the invention. These operations are customarily all subsumed under the term "retanning".

The polyetherpolyol component c) is preferably chosen from homo-, co- or block-co-polyetherpolyols preferably prepared by reacting ethylene oxide and/or propylene oxide with water or with low molecular weight alcohols having at least two hydroxyl groups, for example those selected from the group consisting of ethylene glycol, 1,2- or 1,3-propanediol, 1,2- or 1,4-butanediol, hexanediol, glycerol and pentaerythritol, or with low molecular weight amines bearing at least two amino groups having reactive hydrogen atoms, for example those selected from the group consisting of ethylenediamine and diethylenetriamine. Preferred polyetherpolyols are polyalkylene glycols having a number average molecular weight of 200 to 11,000 g/mol, especially 200 to 4000, particularly preferably 250 to 1000. Very particular preference is given to polyethylene glycols and/or polypropylene glycols, especially polyethylene glycols having an average molecular weight of 200 to 800 g/mol and also tripropylene glycol.

Preferred pigment preparations of the invention comprise
2 to 70%, especially 10 to 50%, by weight of pigment of component a), especially of organic pigment, based on the preparation,
0.1 to 120%, especially 0.2 to 60%, by weight of condensation product of component b), based on pigment of component a),
1 to 30%, preferably 2 to 20%, by weight of polyetherpolyol of component c), based on the preparation, and also
29 to 97% by weight of water, based on the preparation.

The preferred amount of condensation product b) is 0.2 to 10, especially 0.5 to 6, mg/m² , based on the specific surface area of the pigment (B.E.T.) of component a). The specific surface area can be measured for example by the so-called BET method.

The pigment preparation of the invention may include further ingredients. It particularly preferably includes as further component d) a nonionic or anionic dispersant selected from the group consisting of:

d1) sulphosuccinic esters, alkylbenzenesulphonates and sulphated alkoxylated fatty acid alcohols or salts thereof and/or d2) ligninsulphonates from the sulphite and kraft process and/or d3) alkoxylation products and/or their esters obtained by the addition of optionally substituted styrenes to optionally substituted phenols and reaction with ethylene oxide and/or propylene oxide.

The alkoxylated fatty acid alcohols of component d1) are to be understood as meaning in particular those saturated or unsaturated $C_6$–$C_{22}$ fatty acid alcohols, especially stearyl alcohol, which are provided with 5 to 120, preferably 5 to 60, especially with 5 to 30 ethylene oxide. Particular preference is given to a stearyl alcohol alkoxylated with 8 to 10 ethylene oxide units. The sulfated alkoxylated fatty acid alcohols are preferably present in the form of salts, especially as alkali or amine salts, preferably as diethylamine salt.

Suitable ligninsulphonates for component d2) include those obtained by the sulphite or kraft process. They are preferably products which are partly hydrolyzed, oxidized, propoxylated, sulphonated, sulphomethylated or desulphonated and fractionated by known processes, for example according to the molecular weight or according to the degree of sulphonation. Mixtures of sulphite and kraft ligninsulphonates are also very effective. Ligninsulphonates having an average molecular weight between 1000 and 100,000, an active ligninsulphonate content of at least 80% and preferably a low level of polyvalent cations are particularly suitable. The degree of sulphonation can vary within wide limits.

The preferred dispersants of component d3) are compounds of the formula (I) and/or (II) as known for example from DE-A 1 97 12 486

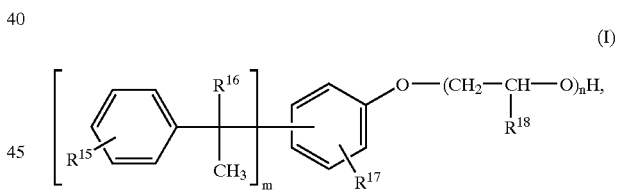

where $R^{15}$ is hydrogen or $C_1$–$C_4$-alkyl, $R^{16}$ is hydrogen or $CH_3$, $R^{17}$ is hydrogen, $C_1$–$C_4$-alkyl, $C_1$–$C_4$-alkoxy, $C_1$–$C_4$-alkoxycarbonyl or phenyl, m is from 1 to 4, n is from 6 to 120, $R^{18}$ is identical or different for each unit with the index n and represents hydrogen, $CH_3$ or phenyl subject to the proviso that in the case of $CH_3$ being present in the various —(—$CH_2$—$CH(R^{18})$—O—)— groups $R^{18}$ is $CH_3$ in 0 to 60% of the total value of n and is hydrogen in 10 to 40% of the total value of n and in the case of phenyl being present in the various —(—$CH_2$—CH($R^{18}$)—O—)— groups $R^{18}$ is phenyl in 0 to 40% of the total value of n and hydrogen in 10 to 60% of the total value of n.

Esters of alkoxylation products (I) of the formula (II)

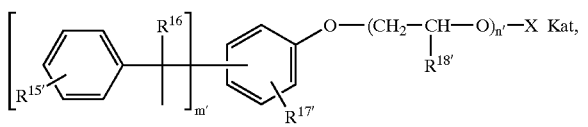

(II)

where
R$^{15'}$, R$^{16'}$, R$^{17'}$, R$^{18'}$, m' and n' assume the scope of meaning of R$^{15}$, R$^{16}$, R$^{17}$, R$^{18}$, m and n, respectively, but independently thereof, X is —SO$_3^-$, —SO$_2^-$, —PO$_3^{--}$ or —CO—(R$^{19}$)—COO$^-$, Kat is a cation selected from the group consisting of H$^+$, Li$^+$, Na$^+$, K$^+$, NH$_4^+$ and HO—CH$_2$CH$_2$—NH$_3^+$, subject to the proviso that in the case of X=—PO$_3^{--}$ two cations are present, and R$^{19}$ is a divalent aliphatic or aromatic radical, preferably C$_1$–C$_4$-alkylene, especially ethylene, monounsaturated C$_2$–C$_4$ radicals, especially acetylene, or optionally substituted phenylene, especially ortho-phenylene, preferred substituents being C$_1$–C$_4$-alkyl, C$_1$–C$_4$-alkoxy, C$_1$–C$_4$-alkoxycarbonyl or phenyl.

The preferred forms mentioned for these two compounds (I) and (II) in DE-A 1 97 12 486 also form part of this invention.

A further component e) may include for example polymeric dispersants. These are for example the compounds mentioned in "Water-Soluble Synthetic Polymers: Properties and Behavior" (Volume I+II by Philip Molyneux, CRC Press, Florida 1983/84).

Further polymeric dispersants are for example water-soluble and also water-emulsifiable compounds, for example homo- and copolymers, graft polymers, graft copolymers and also random block copolymers.

Particularly preferred polymeric dispersants are for example AB, BAB and ABC block copolymers. In the AB or BAB block copolymers, the A segment is a hydrophobic homopolymer or copolymer which provides a bond to the pigment and the B block is a hydrophilic homopolymer or copolymer or a salt thereof and ensures dispersal of the pigment in an aqueous medium. Such polymeric dispersants and their synthesis are known for example from EP-A-518 225 and EP-A-556 649.

Further examples of suitable polymeric dispersants are polyethylene oxides, polypropylene oxides, polyoxymethylenes, polytrimethylene oxides, poly(vinyl methyl ether)s, polyethyleneimines, polyacrylic acids, polyarylamides, polymethacrylic acids, polymethacrylamides, poly-N,N-dimethylacrylamides, poly-N-isopropylacrylamides, poly-N-acryloylglycinamides, poly-N-methacryloylglycinamides, polyvinyl alcohols, polyvinyl acetates, copolymers of polyvinyl alcohols and polyvinyl acetates, polyvinylpyrrolidone, polyvinyloxazolidones, polyvinylmethyloxazolidones.

Natural polymeric dispersants such as cellulose, starch, gelatin or derivatives thereof are also important for use as polymeric dispersants. Polymers of amino acid units for example polylysine, polyaspartic acid, etc. are particularly suitable.

Examples of further anionic dispersants are alkyl sulphates, ether sulphates, ether carboxylates, phosphate esters, sulphosuccinate-amides, paraffinsulphonates, olefin-sulphonates, sarcosinates, isothionates and taurates.

Component d) is preferably used in an amount of from 0.1 to 100%, especially 0.1 to 60%, by weight, based on the pigment of component a). Preferably, they are used in an amount of 0.1 to 8, especially 0.1 to 4, mg/m$^2$, based on the specific surface area (measured by the so-called B.E.T. method for example by N$_2$ adsorption on pulverulent pigment) of the pigment of component a).

In addition, the pigment preparations may comprise further additives customary for preparations of this kind, for example nonionic or anionic wetting agents, inorganic or organic thickeners or thixotropicizers and also preservatives.

Examples of preservatives are isothiazolinones for example 1,2-benzisothiazol-3-(2H)-one, chloro-2-methyl-4-isothiazolin-3-one or 2-methyl-4-isothiazolin-3-one, pentachlorophenol sodium, 1,3,5-triethylolhexahydro-s-triazine or mixtures thereof, which are generally used in an amount of 0 to 1% by weight, preferably 0.05 to 0.5% by weight, especially 0.0001 to 0.2% by weight, based on the preparation.

The invention also provides a process for preparing the pigment preparations of the invention, said process being characterized in that the individual ingredients of the preparations are homogenized with water in wet comminutors. Preferably, the pigment of component a), for example in powder or granule form or as aqueous suspension for example as water-moist press cake, is beaten together with at least a portion of component b) and c) and also optionally d) and/or e) and optionally further additives and water, preferably deionized water, for example by means of a stirred vat or dissolver as exemplary wet comminutors, optionally in conjunction with a precomminution, to form a homogeneous millbase suspension.

The millbase suspension may additionally include portions of low boiling solvents (boiling point <150° C.) which can be carried off, through evaporation, in the course of the subsequent fine milling. However, it may also include portions of higher boiling solvents or further additives as described above, for example milling auxiliaries or wetting agents, thickeners.

The wet comminution process comprises not only the precomminution process but also the fine milling. Preferably, the pigment concentration of the suspension is above the concentration desired for the finished pigment preparation. The desired pigment end concentration is preferably set following the wet comminution. The precomminution is followed by milling to the desired particle fine division. Suitable apparatus for this milling includes for example kneaders, roll mills, kneading screws, ball mills, rotor-stator mills, dissolvers, corundum disc mills, vibratory mills and especially high speed, continuously or discontinuously charged stirred ball mills having grinding media from 0.1 to 5 mm in diameter. The grinding media can be of glass, ceramic or metal, for example steel. The milling temperature is preferably within the range from 0 to 250° C., but generally below 70° C., especially below the cloud point of the dispersants used as component b) and optionally d) and any further surface-active agents optionally used.

In a similarly preferred procedure, the milling can take place wholly or partly in a high pressure homogenizer or in a so-called jet disperser (known from DE-A 19 536 845), whereby the level of grinding media detritus in the suspension or the release of soluble substances from the grinding media (e.g. ions from glass media) can be reduced to a minimum or completely avoided.

The final setting of the pigment preparation to the desired pigment concentration preferably takes place following the milling by addition of optionally further water, optionally remaining dispersant of component b) or d) or e) and optionally further polyetherpolyol of component c) and also optionally further additives such as for example preservatives. The pigment preparation of the invention is preferably adjusted to a pH of 5 to 9, especially 6 to 8.

Following the wet comminution and any concentration adjustment, the pigment preparations can also be converted into a powder or granules by drying, for example by spray drying.

The invention further provides for the use of the pigment preparation for pigmenting and dyeing natural and synthetic materials.

Owing to their particular freedom from foaming, the excellent state of fine division, combined with a high colour strength and brilliance (good coloristics), especially in the case of organic pigments, and also excellent rheological properties and very good stability in storage, the pigment preparations of the invention are particularly useful for producing aqueous emulsion and printing colours and aqueous coating systems (e.g. industrial and architectural coatings).

They are particularly useful for colouring paper in the pulp, for coating paper and for colouring nonwovens and film/sheet.

When used in aqueous polyacrylate, polyester and polyurethane systems, the pigment preparations of the invention exhibit very good compatibility (flocculation resistance), good miscibility and Theological behaviour, high colour strength and very good coloristic properties, especially brilliance.

They are particularly useful for colouring (also to be understood as tinting) the various, customary white emulsion paints or renders which usually include $TiO_2$ and/or $BaSO_4$ and which can be based for example on modified polyvinyl acetates, poly(acrylates) or poly(styrene)-acrylates or latex.

For instance, they are easy to incorporate without flocculation in commercial exterior whites and on application and spreading produce excellent paint films of high colour strength and brilliance.

The use in aqueous binder systems (e.g. emulsion paint, emulsion render, printing, coating and covering systems) is preferably characterized in that the amount of the pigment preparation(s) of the invention required for producing the combination shade hue and colour strength is for example manually or mechanically, e.g. by means of stirred apparatus, introduced into, and homogeneously dispersed in, the aqueous binder system, in which optionally $TiO_2$, $BaSO_4$ or other inorganic white or colour pigments are in a state of fine dispersion, optionally together with further customary additives and the coating of the various substrates is carried out by means of commonly known processes such as, for example, brushing, spraying, roll-coating, knife-coating, dipping.

In addition, the pigment preparations of the invention are very useful in printing inks for ink-jet printing.

Ink-jet printing is known per se and generally takes the form of the printing ink being introduced into a receiving vessel of an ink-jet printing head and being sprayed onto the substrate in small droplets. The ink expulsion in droplet form is preferably effected via a piezoelectric crystal, a heated canule (bubble- or thermo-jet process) or mechanical pressurization to exert pressure on the ink system and thus flinging out ink drops. The droplets are directed at the substrate, for example paper, wood, textiles, plastic or metal, from one or more small nozzles in a targeted manner. Electronic control serves to group the individual droplets together on the substrate to form script characters or graphic patterns.

Another possibility is the process in which electrostatic deflection is used to apply minuscule volumes of an ink jet to a substrate in the form of drops.

The pigment preparations of the invention are especially useful for colouring (also to be understood as shading) paper in the pulp, paper coating materials and also nonwovens and film/sheet, for example cellulose acetate film/sheet.

The colouring of paper in the pulp is preferably characterized in that it comprises a 1st step of for example beating pulp or a pulp mixture together with water, customary fillers such as, for example, inorganic white pigments, calcium carbonate, kaolin, the pigment preparations of the invention and optionally customary auxiliaries such as for example sizing agents, wet strength enhancers, defoamers in a suitable apparatus such as for example so-called hollanders, pulpers or mixing vats with sufficient turbulence, then (step 2) further diluting the pulp mixture by addition of water, optionally further customary auxiliaries such as for example wet strength enhancers, retention aids, agents for setting the pH and thereafter (step 3) feeding the resulting pulp mixture to the wet end of a paper machine, where sheet formation and drying to obtain the desired paper takes place. The pigment preparation of the invention can also be added to the mixing vat following step 1 or in conjunction with step 2.

In this use, the pigment preparations of the invention are notable for excellent retention characteristics (high colour yield) and low foaming in the course of the manufacturing process. Even in the case of high colorations of more than 10% by weight of the pigment preparations, based on pulp, the tendency to foam is so low that the use of defoamers can be reduced to a minimum.

The pigment preparations of the invention possess excellent dispersibility and disbursibility in hydrophilic media. They further have a very low tendency to dry on and out in and on the container.

EXAMPLE 1

0.95 mol of 4,4'-dihydroxydiphenyl sulphone and 1.7 mol of sulphonated ditolyl ether were condensed with 1.4 mol of formaldehyde in aqueous solution. The condensation product was subjected to a cross-flow filtration at a transmembrane pressure of 40 bar and a temperature of 55° C. Spiral-wound membranes having an MWCO level of 3500 g/mol were used. The sulphuric acid content was reduced to <0.2% by weight by a threefold continuous diafiltration. A subsequent concentrating step was used to raise the active ingredient content by 60%. The residual monomer content (4,4'-dihydroxydiphenyl sulphone), based on the total amount of condensation product, decreased from 15 to 8% by weight in the course of the concentrating step.

EXAMPLE 2

1 mol of phenolsulphonic acid and 3 mol of 4,4'-dihydroxydiphenyl sulphone were condensed with 2.4 mol of formaldehyde in aqueous solution at pH 8. The condensation product was subjected to a cross-flow filtration at a transmembrane pressure of 40 bar and a temperature of 55° C. using flat membranes having an MWCO level of 3500 g/mol in a plate module. The sulphate content was reduced to <0.2% by weight by a threefold continuous diafiltration. The residual monomer content (4,4'-dihydroxydiphenyl sulphone+phenolsulphonic acid) decreased from 14 to 7% by weight.

EXAMPLE 3

1 mol of 4,4'-dihydroxydiphenyl sulphone was sulphomethylated with 1.2 mol of sodium bisulphite and 2.3 mol of formaldehyde, the resulting product was adjusted to pH 5 with sulphuric acid and aftercondensed with 1.5 mol of urea and a further 0.65 mol of formaldehyde. The condensation product was then subjected to a cross-flow filtration at a transmembrane pressure of 35 bar and a temperature of 35° C. using a tubular membrane having an MWCO level of 2000 g/mol. The sulphate content was reduced to <0.2% by weight by threefold batchwise diafiltration.

EXAMPLE 4

1 mol of naphthalene was sulphonated with 1.36 mol of sulphuric acid at about 145° C. for about 3 h and the resulting sulphonation mixture was condensed with 1 mol of formaldehyde at 120° C. for about 3 h, cooled down to about 50° C. and adjusted to pH 6 to 7 with sodium hydroxide solution. The solution was then subjected to a cross-flow filtration at 50° C. and a module inlet pressure of 30 bar using a flat membrane in the form of membrane pads having an MWCO level of 3500 g/mol. The sulphate content was reduced from 11.5% by weight to <0.2% by weight by threefold diafiltration. The residual monomer content, based on the total amount of condensation product, decreased from 5 to 1% by weight.

EXAMPLE 5

0.66 mol of 4,4'-dihydroxydiphenyl sulphone and 0.93 mol of naphthalenesulphonic acid were condensed with 0.82 mol of formaldehyde under acidic conditions. The condensation solution was subjected to a cross-flow filtration at 50° C. and a module inlet pressure of 30 bar using spiral-wound membranes having an MWCO level of 8000 g/mol. The sulphuric acid content was reduced from 4 to <0.2% by weight by twofold diafiltration. The residual monomer content, based on the total amount of condensation product, decreased from 37 to 19% by weight.

EXAMPLE 6

1 mol of technical grade terphenyl, i.e. of a terphenyl/biphenyl mixture, was sulphonated with 3 mol of sulphuric acid, and the resulting sulphonation mixture was condensed with 0.67 mol of formaldehyde and neutralized with sodium hydroxide solution. The product was spray-dried.

EXAMPLE 7

0.38 mol of 4,4'-dihydroxydiphenyl sulphone was mixed with β-naphthalene-sulphonic acid, prepared from 1 mol of naphthalene and 1.43 mol of sulphuric acid, and condensed with 0.7 mol of aqueous formaldehyde, adjusted to about pH 3.5 with sodium hydroxide solution and dried in a spray dryer.

EXAMPLE 8

1 mol of ditolyl ether isomer mixture was sulphonated with 2 mol of sulphuric acid and the resulting mixture of ditolyl ether sulphonic acids with 1 mol of 4,4'-dihydroxydiphenyl sulphone was condensed in aqueous solution with 0.93 mol of formaldehyde, adjusted to about pH 3.5 with sodium hydroxide solution and spray-dried.

EXAMPLE 9

0.3 mol of 2-hydroxybiphenyl was sulphonated with 0.37 mol of sulphuric acid, condensed with 0.23 mol of formaldehyde and adjusted to pH 6 with sodium hydroxide solution and spray-dried.

EXAMPLE 10

Preparation of a Dispersant to Conform to the Formula (II)

A nitrogen purged 2 l stirred apparatus was charged with (0.975 mol) 1061 g of tristyrylphenyl ethoxylate emulsifier of the formula (I).

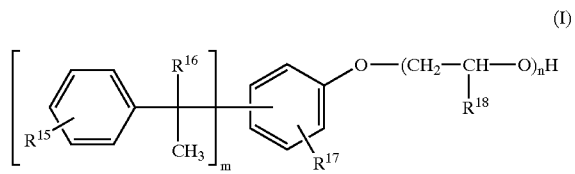

(I)

where
m is 2.7
n is 16
$R_2$ is H
$R_{15}$ is H
$R_{17}$ is H and
$R_{18}$ is H
having a random chain length of about 16 EO units as initial charge, which was admixed at 85° C. with (0.975 mol) 97.5 g of succinic anhydride.
The mixture was stirred at 85° C. under a slow stream of nitrogen for 3 hours, during which the initially turbid suspension became more fluid and turned clear.
Cooling to 50° C. was followed by a filtration through a G-2 glass frit to obtain 1.149 g of a water-white to yellowish viscous liquid having the following properties:
pH at 1% strength in fully demineralized water=3.7
cloud point at 1% strength in fully demineralized water=45–46° C.
acid number=47.4 mg of KOH/g
saponification number=95.2–100%
The mixture thus obtained possesses more than 90% of the dicarboxylic acid monoester of the formula (II).

Example 6a

Alternatively, the condensation solution of Example 6 was membrane-processed as in Example 5 prior to addition of sodium hydroxide solution, affording a preparation free from sulphuric acid and low in monomer.

Example 7a

Alternatively, the condensation solution of Example 7 was membrane-processed as in Example 5 prior to addition of sodium hydroxide solution, affording a preparation free from sulphuric acid and low in monomer.

Example 8a

Alternatively, the condensation solution of Example 8 was subjected to a cross-flow filtration at 55° C. and a module inlet pressure of 30 bar after addition of the sodium hydroxide solution. The membranes used were ultrafiltration membranes in the form of flat membranes (MWCO 8000 g/mol) which were mounted on a plate module. The sulphate content was reduced from 5.0 to <0.2% by threefold diafiltration and subsequent concentrating.

Example 9a

Alternatively, the condensation solution of Example 9 was subjected to a cross-flow filtration at 45° C. and a module inlet pressure of 20 bar after addition of the sodium hydroxide solution. The membranes used were ultrafiltration membranes in the form of flat membranes (MWCO 3500 g/mol) as membrane pads. The sulphate content was reduced from 5.2 to <0.3% by twofold diafiltration and subsequent concentrating.

EXAMPLE 11

A high speed laboratory stirrer was charged with
53.6 parts by weight of deionized water as initial charge, to which were added with stirring
8.2 parts by weight of the dispersant (comp. b, b1) of Example 9,
8.0 parts by weight of polyethylene glycol having an average molecular weight of 400 g/mol (PEG 400; comp. c),
0.2 part by weight of 1,2-benzisothiazol-3-(2H)-one as preservative to form a homogeneous and completely dissolved solution.
Then
30 parts by weight of the pigment Colour Index Pigment Blue 15:3 (B.E.T.=68 m$^2$/g) were added and completely homogenized.

Thereafter the suspension was adjusted to a pH of 7.0 by means of dilute sodium hydroxide solution and ground for 60 minutes with cooling in a 1 l laboratory bead mill using glass beads 0.47–0.63 mm in diameter.

The 30% strength blue pigment preparation obtained had very good flowability and stability in storage, which when used in commercially available aqueous emulsion paint systems and coating systems is highly compatible and notable for high colour strength.

The pigment preparation thus obtained was diluted to a pigment concentration of 4% in a printing ink for ink-jet printing, the composition and parameters of the printing ink being chosen as follows:

| | |
|---|---|
| deionized water | 72.7% by weight |
| polyethylene glycol (Mw: 800 g/mol) | 9.0% by weight |
| 30% pigment preparation: | 13.3% by weight |
| 2-pyrrolidone: | 5.0% by weight |
| pH | 7.2 |
| surface tension: | >30 mN/m |
| max. particle size (disc centrifuge): | <0.2 μm |

The printing ink proved satisfactorily printable on a commercially available ink-jet printer (HP, Desk Jet® 690 C, after replacing the blue dye ink originally present with the printing ink of the invention), producing prints of high colour strength and brilliance and also good water and marker fastness.

EXAMPLE 29

Example 11 was repeated to prepare further advantageous, high concentration pigment preparations using the components indicated in Table 1.

The adjusting of the pH to the stated value was effected by addition of dilute sodium hydroxide solution or dilute sulphuric acid prior to the grinding, if necessary. The viscosity was measured 24 h after production of the preparations, using a Haake Viskotester VT 550 rotary viscometer and an E 100 spindle. The reported viscosities are based on a measurement at room temperature and a shear rate of 70 s$^{-1}$.

The percentages reported for the dispersants used (comp. b)) are based on the solids content of the respective aqueous solution.

TABLE 1

| Example | (Comp. a) Colour Index Pigment (B.E.T.) | % by weight | (Comp. b) Dispersant (solids content) | % by weight | (Comp. d) Dispersant | % by weight | (Comp. c) | % by weight | Preservative as per Ex. 11 % by weight | Water % by weight | pH | Viscosity mPas |
|---|---|---|---|---|---|---|---|---|---|---|---|---|
| 11 | Pigment Blue 15:3 (68 m$^2$/g) | 30 | as per Ex. 9 (spray-dried) | 8.2 | — | — | PEG 400[1] | 8 | 0.2 | 53.6 | 7 | 105 |
| 12 | Pigment Blue 15:3 (68 m$^2$/g) | 30 | as per Ex. 7 (spray-dried) | 8.2 | — | — | PEG 400[1] | 8 | 0.2 | 53.6 | 7.4 | 165 |
| 12a | Pigment Blue 15:3 (68 m$^2$/g) | 35 | as per Ex. 7a (30%) | 23.8 | — | — | PEG 400[1] | 8 | 0.2 | 33 | 7.6 | 254 |
| 13 | Pigment Violet 23 (85 m$^2$/g) | 30 | as per Ex. 2 (28%) + as per Ex. 5 (30%) | 27.3 16.8 | as per Ex. 10 | 1.3 | PEB 400[1] | 5 | 0.25 | 19.35 | 7.3 | 156 |
| 14 | Pigment Violet 23 (85 m$^2$/g) | 30 | as per Ex. 2 (28%) + as per Ex. 4 (93.4%) | 27.3 5.4 | as per Ex. 10 | 1.3 | tri-propylene-glycol | 5 | 0.25 | 30.75 | 7.8 | 247 |
| 15 | Pigment Yellow 110 (55 m$^2$/g) | 25 | as per Ex. 9 (spray-dried) | 5.5 | — | — | tri-propylene glycol | 8 | 0.2 | 61.3 | 7.5 | 137 |
| 15a | Pigment Yellow 110 (55 m$^2$/g) | 28 | as per Ex. 9a (30%) | 18.3 | — | — | tri-propylene glycol | 8 | 0.2 | 45.5 | 7.4 | 117 |
| 16 | Pigment Yellow 153 (14 m$^2$/g) | 35 | as per Ex. 4 (spray-dried) | 0.5 | sulphite lignin Na salt | 1.2 | tri-propylene glycol | 8 | 0.2 | 55.15 | 7.5 | 8.3 |
| 17 | Pigment Yellow 155 (31 m$^2$/g) | 30 | as per Ex. 5 (30%) | 6.2 | — | — | PEG 400[1] | 10 | 0.25 | 53.55 | 7.3 | 127 |

TABLE 1-continued

| Example | (Comp. a) Colour Index Pigment (B.E.T.) | % by weight | (Comp. b) Dispersant (solids content) | % by weight | (Comp. d) Dispersant | % by weight | (Comp. c) | % by weight | Preservative as per Ex. 11 % by weight | Water % by weight | pH | Viscosity mPas |
|---|---|---|---|---|---|---|---|---|---|---|---|---|
| 18 | Pigment Orange 36 (20 m²/g) | 30 | as per Ex. 8 (spray-dried) | 2.4 | — | — | PEG 400[1] | 8 | 0.25 | 59.35 | 6.9 | 75 |
| 18a | Pigment Orange 36 (20 m²/g) | 35 | as per Ex. 8a (30%) | 8.5 | — | — | PEG 400[1] | 8 | 0.25 | 48.25 | 7.2 | 98 |
| 19 | Pigment Orange 72 (37 m²/g) | 35 | as per Ex. 4 (spray-dried) | 2.5 | — | — | 1,2-propane-diol | 10 | 0.1 | 52.4 | 7.2 | 255 |
| 20 | Pigment Orange 72 (37 m²/g) | 35 | as per Ex. 4 (spray-dried) + as per Ex. 2 (28%) | 1.4 13.9 | — | — | tri-propylene glycol | 8 | 0.25 | 41.45 | 7.2 | 96 |
| 21 | Pigment Red 242 (27 m²/g) | 30 | as per Ex. 1 (22%) | 14.7 | as per Ex. 10 | 0.45 | PEG 400[1] | 10 | 0.25 | 44.6 | 6.8 | 229 |
| 22 | Pigment Red 242 | 35 | as per Ex. 1 (22%) | 17.2 | alkoxylated castor oil (40 ME of ethylene oxide) | 0.5 | PEG 400[1] | 8 | 0.25 | 39.05 | 7.2 | 125 |
| 23 | Pigment Red 272 (27 m²/g) | 30 | as per Ex. 1 (22%) + as per Ex. 2 (28%) | 5.4 8.6 | as per Ex. 10 | 0.5 | PEG 400[1] | 8 | 0.25 | 47.25 | 7.8 | 190 |
| 24 | Pigment Red 272 (27 m²/g) | 40 | as per Ex. 3 (30%) | 10.8 | sulphite lignin Na salt | 10.8 | 1,2-propane-diol | 12 | 0.1 | 26.3 | 7.7 | 225 |
| 25 | Pigment Red 254 (26 m²/g) | 30 | as per Ex. 9 (spray-dried) | 3.6 | as per Ex. 10 | 0.5 | PEG 400[1] | 8 | 0.2 | 57.7 | 7.6 | 28 |
| 25a | Pigment Red 254 (26 m²/g) | 35 | as per Ex. 9a (30%) | 9.1 | as per Ex. 10 | 0.5 | PEG 400[1] | 8 | 0.2 | 47.2 | 7.2 | 75 |
| 26 | Pigment Red 254 (26 m²/g) | 35 | as per Ex. 1 (22%) | 8.2 | — | — | 1,2-propane-diol | 12 | 0.1 | 44.7 | 7 | 47 |
| 27 | Pigment Red 254 (26 m²/g) | 40 | as per Ex. 5 (30%) | 6.25 | — | — | tri-propylene glycol | 8 | 0.25 | 45.5 | 7.2 | 80 |
| 28 | Pigment Red 254 (26 m²/g) | 40 | as per Ex. 2 (28%) | 11.4 | as per Ex. 10 | 1 | tri-propylene glycol | 8 | 0.25 | 39.35 | 7.7 | 122 |
| 29 | Pigment Yellow 150 as per Formula V which includes melamine as inclusion compound | 25 | as per Ex. 4 (spray-dried) | 7.8 | as per Ex. 10 | 1.5 | tri-propylene glycol | 10 | 0.25 | 55.45 | 7.5 | 270 |

[1] polyethylene glycol having an average molecular weight of 400 g/mol

Testing of Foaming Characteristics of Pigment Preparations of Invention

Test Method

A 100 ml glass measuring cylinder was charged with 0.8 g of the pigment preparation to be tested and made up with 80 ml of tap water or demineralized (DM) water. The sealed measuring cylinder was then given 20 horizontal shakes by hand and the height of the foam [mm] was determined visually immediately thereafter and after 2.5, 5 and 10 min.

| Foam height (mm) after 10 min | Assessment |
|---|---|
| >25 | foaming |
| 15–25 | weakly foaming |
| 5–15 | low in foam |
| 0–5 | foam-free |

All the pigment preparations of Examples 11–28 and also 12a, 15a, 18a and 25a according to the invention were rated foam-free or low in foam.

As can be seen from Table 2, the foam height drops rapidly over the period of measurement; that is, the preparations can virtually all be rated "low in foam" after just 2.5 min.

TABLE 2

Foam test results

| Pigment preparation as per | Foam height in tap water | | | | Foam height in DM water | | | |
|---|---|---|---|---|---|---|---|---|
| | at once (mm) | after 2.5 min (mm) | after 5 min (mm) | after 10 min (mm) | at once (mm) | after 2.5 min (mm) | after 5 min (mm) | after 10 min (mm) |
| Example 11 | 25 | 4 | 3 | 0 | 28 | 10 | 6 | 3 |
| Example 12 | 18 | 1 | 1 | 0 | 20 | 9 | 8 | 5 |
| Example 14 | 22 | 5 | 3 | 3 | 20 | 17 | 15 | 15 |
| Example 17 | 28 | 11 | 7 | 6 | 26 | 16 | 14 | 9 |
| Example 20 | 5 | 0 | 0 | 0 | 6 | 2 | 1 | 1 |
| Example 21 | 33 | 14 | 11 | 7 | 29 | 9 | 7 | 6 |
| Example 23 | 30 | 19 | 16 | 10 | 35 | 15 | 14 | 9 |
| Example 28 | 15 | 1 | 1 | 0 | 20 | 1 | 0 | 0 |
| Example 29 | 20 | 5 | 3 | 3 | 22 | 8 | 5 | 5 |

USE EXAMPLES 30–38

The outstanding suitability of the pigment preparations of the invention for the pulp coloration of paper was tested by the following method:

a) Preparing the Paper Raw Material

A laboratory hollander was used to grind a pulp mixture consisting of

70% by weight of bleached eucalyptus pulp

30% by weight of bleached pine sulphate pulp at a consistency of 3% in tap water to a freeness of 25° SR.

b) Sheet Formation and Coloration

In a dyeing beaker (1000 ml), 2.5 g of the above-ground fibre (solids) were with constant stirring diluted in 600 ml of tap water and admixed with 30% by weight of titanium dioxide pigment (Bayertitan® R-PL-1, Bayer AG) based on fibre solids, in the form of a 10% strength by weight aqueous dispersion. After stirring for 10 min, the amount of each pigment preparation (see below) required for achieving 1/25 standard depth of shade (DIN 54000) was added, followed after further stirring for 5 min by 5% by weight of Nadavin®DHF, Bayer AG, based on fibre. If necessary, the pH was adjusted to 6.5–7.0 after a further 10 min.

Sheet formation was carried out on a Rapid-Köthen® system and the sheet was then dried in a drying cabinet at about 95° C. over about 8 min.

The amount required of each pigment preparation for 1/25 standard depth of shade was determined by means of the above-described process by measuring the colour strength difference on a Macbeth Color Eye 7000 against a coloristically equivalent textile swatch (1/25 standard depth of shade) whose colour strength was set at 100%.

After the amount of each pigment preparation required for 1/25 standard depth of shade was determined, analogous step solutions were prepared on a laboratory paper machine in accordance with the abovementioned recipes.

These base papers were tested for lightfastness (DIN 54004), and styrene and plasticizer (dibutyl phthalate) fastness. The assessment took place 24 hours after immersion of the coloured paper strips with regard to bleeding and any staining of the solution.

Similarly, the acid fastness (10% strength sulphuric acid) and alkali fastness (10% strength sodium carbonate solution) were tested by allowing a drop of the respective solution to act on the dyed paper for 1 min, removing the excess by means of filter paper and assessing the papers in the moist state.

Fastness Assessment good: + limited: +/− poor: −

The use of the pigment preparations of the invention produced very strong, brilliant colourings having excellent fastness properties. The test results of Use Examples 30–38 are summarized in Table 3.

| Use Example | Tested pigment preparation as per | Amount of pigment preparation required for 1/25 standard depth of shade %/fibre | Lightfastness DIN 54004 level | Acid fastness | Alkali fastness | Styrene fastness | Plasticizer fastness |
|---|---|---|---|---|---|---|---|
| 30 | Example 11 | 3 | 6–7 | + | + | + | + |
| 31 | Example 12 | 3 | 6–7 | + | + | + | + |
| 32 | Example 14 | 2.2 | 5–6 | + | + | + | + |
| 33 | Example 17 | 3.2 | 7 | + | + | + | + |
| 34 | Example 20 | 3 | 7–8 | + | + | + | + |
| 35 | Example 21 | 4.7 | 7 | + | + | + | + |
| 36 | Example 23 | 3.3 | 8 | + | + | | + |
| 37 | Example 28 | 2.3 | 6–7 | + | + | + | + |
| 38 | Example 29 | 1.8 | 8 | + | + | + | + |

The pigment preparations of the invention were also particularly useful for colouring so-called decorative laminate papers of the type used for producing decorative laminates.

For instance, base papers each produced by Use Examples 30–38 were each coated with a 50% strength aqueous melamineformaldehyde solution to a resin content of about 56%, precured in a continuous drying cabinet process at 120° C. to a residual moisture content of about 4–6% by weight over 2.5 min and pressed on a high pressure press at various temperatures from 150 to 180° C. and a pressure of 10 N/mm² for 5 min to form a laminate.

The laminate construct consisted of:
1 press platen, chromed,
2 low pigmented underlay papers (impregnated with melamine resin)
2 soda kraft papers (impregnated with phenolic resin)
1 decorative paper pigmented according to invention (as per Examples 30–38)
1 press platen, chromed The (decorative) papers pigmented according to the invention proved to be satisfactorily pressable within the reported temperature range and produced laminates of high brilliance and colour strength. No shift in hue was observed on pressing at 150° C. and 180° C.

USE EXAMPLE 39

3 parts by weight of a pigment preparation prepared as per Example 28 were homogeneously hand stirred for 5 minutes into
100 parts by weight of a commercially available white emulsion paint (Tinova® Täcklasur, from Akzo Nobel) to produce a brilliant, strong, flocculation-resistant and speckle-free paint which it was impossible to improve any further by mixing with a high speed stirrer for 3 min.
A 10% paint had similar characteristics.

What is claimed is:

1. A aqueous pigment composition comprising
   a) at least one pigment,
   b) at least one condensation product based on
      A) sulphonated aromatics,
      B) aldehydes and/or ketones and optionally
      C) one or more compounds comprising a member selected from the group consisting of unsulphonated aromatics, urea and urea derivatives, and
   c) at least one polyetherpolyol having an atmospheric pressure boiling point of greater than 250° C.

2. The aqueous pigment composition of claim 1, comprising as component b) at least one condensation product based on
   a) at least one sulphonated aromatic comprising a member selected from the group consisting of naphthalenesulphonic acids, phenolsulphonic acids, dihydroxybenzenesulphonic acids, sulphonated ditolyl ethers, sulphomethylated 4,4'-dihydroxydiphenyl sulphone, sulphonated diphenylmethane, sulphonated biphenyl, and sulphonated hydroxybiphenyl,
   b) formaldehyde and optionally
   c) one or more compounds comprising a member selected from the group consisting of phenol, cresol, 4,4'-dihydroxydiphenyl sulphone, dihydroxydiphenylmethane, urea, dimethylolurea, melamine and guanidine.

3. The aqueous pigment composition of claim 1, wherein the condensation product of component b) has an average degree of condensation of 1 to 150.

4. The aqueous pigment composition of claim 1, wherein the residual monomer content of the condensation product of component b) is less than 30% by weight, based on the condensation product.

5. The aqueous pigment composition of claim 1, comprising
   c1) 2 to 70% of pigment of component a, based on the composition,
   c2) 0.1 to 120% of component b, based on pigment of component a),
   c3) 1 to 30%, by weight of polyetherpolyol of component c), based on the composition, and also
   c4) 29 to 97% by weight of water, based on the composition.

6. The aqueous pigment composition of claim 1, comprising as component c) homo-, co- or block-copolyetherpolyols prepared by reacting ethylene oxide and/or propylene oxide with water or with low molecular weight alcohols having at least two hydroxyl groups, or with low molecular weight amines bearing at least two amino groups having reactive hydrogen atoms.

7. The aqueous pigment composition of claim 1, further comprising a component d) comprising a nonionic or anionic dispersant comprising a member selected from the group consisting of
   d1) sulphosuccinic esters, alkylbenzenesulphonates and sulphated alkoxylated fatty acid alcohols or salts thereof,
   d2) ligninsulphonates from the sulphite and kraft process, and
   d3) alkoxylation products and their esters obtained by the addition of styrenes or substituted styrenes to phenols or substituted phenols and reaction with ethylene oxide and/or propylene oxide.

8. The aqueous pigment preparation of claim 1, wherein component a) is a azo metal complex pigment of the formula (III)

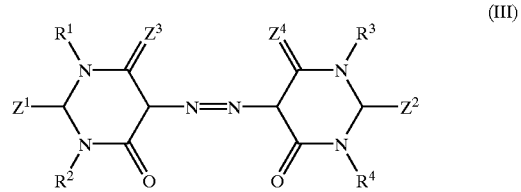

where
$R^1$, $R^2$, $R^3$ and $R^4$ are independently hydrogen, alkyl, aryl, aralkyl, or hetaryl,
$Z^1$ to $Z^4$ are independently O or $NR^5$, and
$R^5$ is hydrogen or cyano,
in the form of a salt, complex, solid solution, inclusion or intercalation compound.

9. The aqueous pigment preparation of claim 1, wherein component a) is a azo metal complex pigment of the formulae IV or V

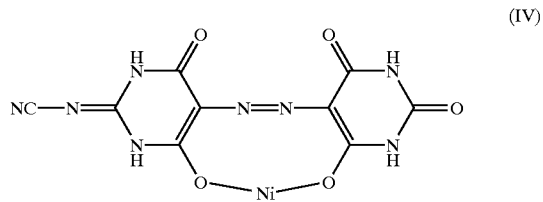

-continued

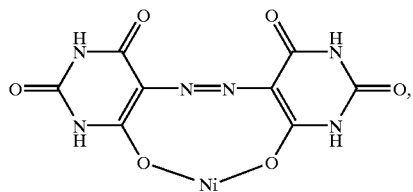
(V)

in the form of a salt, complex, solid solution, inclusion or intercalation compound.

10. The aqueous pigment composition of claim 1, wherein component a) is a azo metal complex pigment of the formulae II, IV, or V (III)

where
$R^1, R^2, R^3$ and $R^4$ are independently hydrogen, alkyl, aryl, aralkyl, or hetaryl,
$Z^1$ to $Z^4$ are independently O or $NR^5$, and
$R^5$ is hydrogen or cyano,

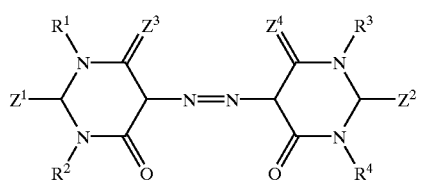
(IV)

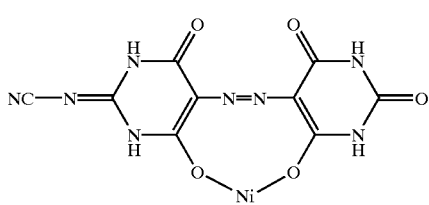
(V)

in the form of an intercalation compound wherein the included compound is either a cyclic compound, an acyclic compound or a heterocyclic compound.

11. The aqueous pigment composition of claim 10, wherein the included compound is a carboxylic or sulphonic acid amide, urea, a substituted urea, 2,4,6-triamino-1,3,5-triazine, acetoguanamine or benzoguanamine.

12. A process for preparing the aqueous pigment composition of claim 1, wherein the individual ingredients a), b), and c) of the composition are homogenized together with water in wet comminutors.

13. A process comprising the step of pigmenting natural or synthetic materials with an aqueous pigment composition of claim 1.

14. A process comprising the step of pigmenting aqueous polyacrylate, polyester or polyurethane coating systems, with an aqueous pigment composition of claim 1.

15. A process comprising the step of pigmenting matter with an aqueous pigment composition of claim 1.

16. A process comprising the step of coloring paper, nonwovens, film/sheet or paper coating materials with an aqueous pigment composition of claim 1.

17. A process comprising the step of coloring emulsion paints with an aqueous pigment composition of claim 1.

18. A process comprising the step of producing aqueous printing inks with an aqueous pigment composition of claim 1.

19. Tanning material containing a composition of
   a) at least one pigment,
   b) at least one condensation product based on
      A) sulphonated aromatics,
      B) aldehydes and/or ketones and optionally
      C) one or more compounds comprising a member selected from the group consisting of unsulphonated aromatics, urea and urea derivatives, and
   c) at least one polyetherpolyol having an atmospheric pressure boiling point of greater than 250° C.
wherein the ingredients a), b), and c) of the composition are homogenized together with water in wet comminutors.

20. Drilling aids containing a composition of
   a) at least one pigment,
   b) at least one condensation product based on
      A) sulphonated aromatics,
      B) aldehydes and/or ketones and optionally
      C) one or more compounds comprising a member selected from the group consisting of unsulphonated aromatics, urea and urea derivatives, and
   c) at least one polyetherpolyol having an atmospheric pressure boiling point of greater than 250° C.
wherein the ingredients a), b), and c) of the composition are homogenized together with water in wet comminutors.

21. Plasticity enhancers containing a composition of
   a) at least one pigment,
   b) at least one condensation product based on
      A) sulphonated aromatics,
      B) aldehydes and/or ketones and optionally
      C) one or more compounds comprising a member selected from the group consisting of unsulphonated aromatics, urea and urea derivatives, and
   c) at least one polyetherpolyol having an atmospheric pressure boiling point of greater than 250° C.
wherein the ingredients a), b), and c) of the composition are homogenized together with water in wet comminutors.

22. Dispersants containing a composition of
   a) at least one pigment,
   b) at least one condensation product based on
      A) sulphonated aromatics,
      B) aldehydes and/or ketones and optionally
      C) one or more compounds comprising a member selected from the group consisting of unsulphonated aromatics, urea and urea derivatives, and
   c) at least one polyetherpolyol having an atmospheric pressure boiling point of greater than 250° C.
wherein the ingredients a), b), and c) of the composition are homogenized together with water in wet comminutors.

* * * * *